US011645918B2

United States Patent
Brandon et al.

(10) Patent No.: US 11,645,918 B2
(45) Date of Patent: May 9, 2023

(54) COORDINATED DISPATCHING OF AUTONOMOUS VEHICLE FLEET

(71) Applicant: GM Cruise Holdings LLC, San Francisco, CA (US)

(72) Inventors: Jeffrey Brandon, Phoenix, AZ (US); Alexander Willem Gerrese, San Francisco, CA (US); Yifei Zhang, San Francisco, CA (US); Jeremy Stephen Juel, San Francisco, CA (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 373 days.

(21) Appl. No.: 17/008,816

(22) Filed: Sep. 1, 2020

(65) Prior Publication Data

US 2022/0068139 A1 Mar. 3, 2022

(51) Int. Cl.
| | |
|---|---|
| G06Q 50/30 | (2012.01) |
| G06Q 10/02 | (2012.01) |
| B60W 60/00 | (2020.01) |
| G08G 1/00 | (2006.01) |
| G05D 1/02 | (2020.01) |

(52) U.S. Cl.
CPC ....... *G08G 1/202* (2013.01); *B60W 60/00253* (2020.02); *G05D 1/0293* (2013.01); *G06Q 10/02* (2013.01); *G06Q 50/30* (2013.01); *G08G 1/22* (2013.01)

(58) Field of Classification Search
CPC ... G08G 1/202; G08G 1/22; B60W 60/00253; G05D 1/0293; G06Q 10/02; G06Q 50/30
See application file for complete search history.

(56) References Cited

U.S. PATENT DOCUMENTS

| | | | |
|---|---|---|---|
| 10,152,053 B1* | 12/2018 | Smith | G06Q 10/02 |
| 10,846,633 B2* | 11/2020 | Magazinik | G06Q 50/32 |
| 2008/0015923 A1* | 1/2008 | Masaba | H04L 67/52 |
| | | | 705/7.13 |
| 2016/0129999 A1* | 5/2016 | Mays | B64C 39/024 |
| | | | 701/2 |
| 2017/0186126 A1* | 6/2017 | Marco | G06Q 50/30 |
| 2018/0211541 A1* | 7/2018 | Rakah | G08G 1/148 |
| 2018/0231984 A1* | 8/2018 | Alonso-Mora | G05D 1/0291 |
| 2020/0160709 A1* | 5/2020 | Ramot | B60W 60/00253 |
| 2022/0068139 A1* | 3/2022 | Brandon | G06Q 10/02 |

* cited by examiner

*Primary Examiner* — Peter D Nolan
*Assistant Examiner* — Anwar Mohamed
(74) *Attorney, Agent, or Firm* — Akona IP

(57) ABSTRACT

A fleet management system coordinates multiple autonomous vehicles (AVs) to transport a group of passengers from one location to another. A single user can submit a request to the fleet management system to provide a ride for the group, the request specifying the number of passengers and the pickup location. The fleet management system determines a number of AVs to transport the group based on the number passengers, and dispatches this number of AVs to the pickup location. The AVs pick up the passengers at the pickup location, drive the passengers to a destination, and drop the passengers off at the destination.

20 Claims, 5 Drawing Sheets

COORDINATED DISPATCHING OF AUTONOMOUS VEHICLE FLEET

TECHNICAL FIELD OF THE DISCLOSURE

The present disclosure relates generally to autonomous vehicles (AVs) and, more specifically, to methods and systems for coordinating dispatch of multiple AVs for groups of passengers.

BACKGROUND

When large groups of people travel by car between locations, it is complicated for them to arrange rides. Typically, multiple people in the group each individually request a car (e.g., by hailing a taxi or using an app), and the group disperses into the cars that arrive. This uncoordinated approach can be time-consuming and error-prone. For example, the cars that arrive in response to the requests may not provide enough seats for everyone in the group. This leads to additional, staggered requests, with some people waiting at the pickup location for another car to arrive, and other people waiting at the destination for the group that was delayed. Other times, too many people in the group request cars, which is wasteful. Furthermore, multiple individually-requested cars may not arrive at the same drop-off point. Even if the people requesting the rides give the same destination address, at a large venue, such as a stadium or an arena, the cars may not drop off their respective passengers at the same point. This leads to confusion and delays among the group as they attempt to find each other at the destination. As an alternative, a large group can request a bus or limousine service, but such services are expensive and often are not readily available on-demand.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
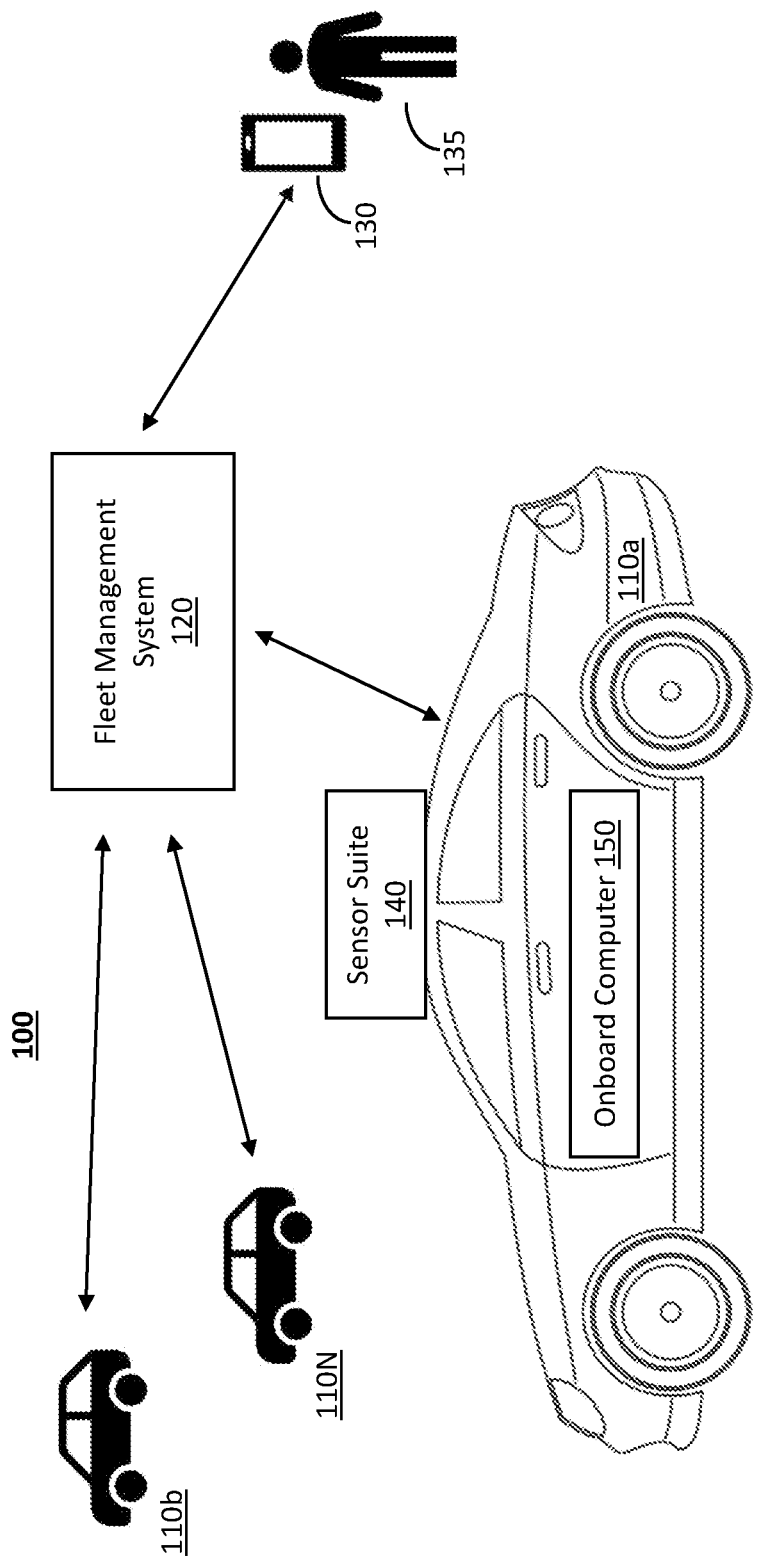
FIG. 1 is a block diagram illustrating a system including a fleet of AVs that can be dispatched in a coordinated manner to a group of passengers according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

A fleet management system described herein coordinates multiple autonomous vehicles (AVs) to transport a group of people from one location to another. A single user can submit a request to the fleet management system to provide a ride for the group, the request specifying the number of passengers and the pickup location. The fleet management system determines a number of AVs to transport the group based on the number passengers, and dispatches this number of AVs to the pickup location. The AVs pick up the passengers at the pickup location, drive the passengers to a destination, and drop the passengers off at the destination.

The coordinated dispatching allows large groups to obtain the right number of vehicles to transport them quickly and easily, without requiring multiple group members to volunteer to order rides separately. In addition, the fleet management system can help maintain group cohesion as the group travels from place to place. For example, the fleet management system can count the number of passengers that have entered across the multiple cars to ensure that all of the group members have gotten in one of the vehicles, and nobody was left behind at the pickup location. As another example, the fleet management system can instruct the AVs to drop their respective passengers at a same drop-off point, or at nearby drop-off points, so the group members can easily find each other at their destination.

The fleet management system may provide various user interfaces that further enhance group cohesion during the ride. For example, the fleet management system can provide a map interface that shows group members the location of all of the AVs associated with the group. After the AVs begin dropping off group members, the map interface may show the precise drop-off locations, which can help the group members find each other.

The fleet management system may enable the requesting user to select multiple pickup locations if group members are coming from different places. In addition, the fleet management system may enable the requesting user, or another group member, to change the destination location for one or more of the AVs. For example, a group member in one AV may take over control of the AV from the requesting user, and may select a different destination for the AV to drive to.

Embodiments of the present disclosure provide a method for providing a coordinated ride, the method including receiving, from a user device, a ride request comprising a pickup location, a destination location, and a number of passengers, the number of passengers exceeding passenger capacity for an AV of an AV fleet, the AV fleet comprising a plurality of AVs; determining a number of AVs to service the ride request, the number of AVs sufficient to transport the number of passengers; selecting a set of AVs from the AV fleet to service the ride request, the set of AVs comprising the determined number of AVs, the set of AVs selected based on a proximity of each AV in the set of AVs to the pickup location; instructing each AV of the set of AVs to drive autonomously to the pickup location and pick up a portion of the passengers associated with the ride request; and instructing each AV of the set of AVs to drive autonomously its respective portion of the passengers to the destination location.

Embodiments of the present disclosure also provide for a fleet management system including a user interface (UI) server and a vehicle manager. The UI server is configured to receive a ride request that includes a number of passengers, a pickup location, and a destination location. The vehicle manager is configured to determine a number of autonomous vehicles (AVs) to service the ride request, the number of AVs sufficient to transport the number of passengers; select a set of AVs from an AV fleet to service the ride request, the AV fleet comprising a plurality of AVs, the set of AVs comprising the determined number of AVs, and the set of AVs selected based on a proximity of each AV in the set of AVs to the pickup location; instruct each AV of the set of AVs to drive autonomously to the pickup location and pick up a portion of the passengers associated with the ride request; and instruct each AV of the set of AVs to drive autonomously its respective portion of the passengers to the destination location.

Embodiments of the present disclosure also provide for a system for providing coordinated rides, the system including a plurality of AVs and a fleet management system. The fleet management system is configured to receive a request for a coordinated ride, the request comprising a number of passengers, a pickup location, and a destination location; determine a number of AVs to service the request, the number of AVs sufficient to transport the number of passengers; select a set of AVs from the plurality of AVs to service the request, the set of AVs comprising the determined number of AVs, and the set of AVs selected from the plurality of AVs based on a proximity of each AV in the set of AVs to the pickup location; instruct each AV of the set of AVs to drive autonomously to the pickup location; and instruct each AV of the set of AVs to drive autonomously to the destination location.

As will be appreciated by one skilled in the art, aspects of the present disclosure, in particular aspects of coordinated dispatching of an AV fleet, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example AV System for Coordinated Group Ride Dispatch

FIG. 1 is a block diagram illustrating a system 100 including an example AV fleet that can be dispatched in a coordinated manner to a group of passengers, according to some embodiments of the present disclosure. The system 100 includes a fleet of AVs 110, including AV 110a, AV 110b, and AV 110N, a fleet management system 120, and a user device 130. For example, a fleet of AVs may include a number N of AVs, e.g., AV 110a through AV 110N. AV 110a includes a sensor suite 140 and an onboard computer 150. AVs 110b through 110N also include the sensor suite 140 and the onboard computer 150. A single AV in the fleet is referred to herein as AV 110, and the fleet of AVs is referred to collectively as AVs 110.

The fleet management system 120 receives service requests for the AVs from user devices, such as user device 130. For example, the user 135 accesses an app executing on the user device 130 and, using the app, enters a ride request for a group of passengers. The user device 130 transmits the ride request to the fleet management system 120. The ride request includes at least a pickup location (e.g., the current location of the user device 130) and a number of passengers in the group. The fleet management system 120 determines the number of AVs needed to transport the requested number of passengers, selects this number of AVs from the fleet of AVs 110, and dispatches the selected AVs to the pickup location to carry out the service request. For example, if each AV 110 includes four passenger seats, and the fleet management system 120 receives a request to provide a ride to ten passengers, the fleet management system 120 selects three AVs from the fleet to transport the group of passengers.

The AV 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. In some embodiments, some or all of the vehicle fleet managed by the fleet management system 120 are non-autonomous vehicles dispatched by the fleet management system 120 in a coordinated manner as described herein, and the vehicles are driven by human drivers according to instructions provided by the fleet management system 120.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include interior and exterior cameras, radar sensors, sonar sensors, lidar (light detection and ranging) sensors, thermal sensors, GPS, wheel speed sensors, inertial measurement units (IMUS), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the exterior and/or interior of the AV 110.

The onboard computer 150 is connected to the sensor suite 140 and functions to control the AV 110 and to process sensed data from the sensor suite 140 and/or other sensors in order to determine the state of the AV 110. Based upon the vehicle state and programmed instructions, the onboard computer 150 modifies or controls behavior of the AV 110. The onboard computer 150 is preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems.

The fleet management system 120 manages the fleet of AVs 110. The fleet management system 120 may manage one or more services that provides or uses the AVs, e.g., a service for providing rides to users using the AVs. The fleet management system 120 selects one or more AVs (e.g., AVs 110a and 110b) from a fleet of AVs 110 to perform a particular service or other task, and instructs the selected AV(s) (e.g., AVs 110a and 110b) to drive to a particular location (e.g., an address to pick up the group of passengers). The fleet management system 120 also manages fleet maintenance tasks, such as fueling, inspecting, and servicing of the AVs. As shown in FIG. 1, the AVs 110 communicate with the fleet management system 120. The AVs 110 and fleet management system 120 may connect over a public network, such as the Internet. The fleet management system 120 is described further in relation to FIG. 6.

The user device 130 is a personal device of the user 135, e.g., a smartphone, tablet, computer, or other device for interfacing with a user of the fleet management system 120. The user device 130 may provide one or more applications (e.g., mobile device apps or browser-based apps) with which the user 135 can interface with a service that provides or uses AVs, such as a service that provides rides to groups of passengers in AVs. The service, and particularly the AVs associated with the service, is managed by the fleet management system 120, which may also provide the application to the user device 130. The application may provide a user interface to the user 135 during the rides, such as a map showing the locations of the AVs 110 transporting the group of passengers. Some of all of the other passengers in the group associated with the user 135 may have their own user devices similar to user device 130. These other user devices may interface with the fleet management system 120 in a similar manner.

Example Coordinated Dispatch Use Case

Figure 2:
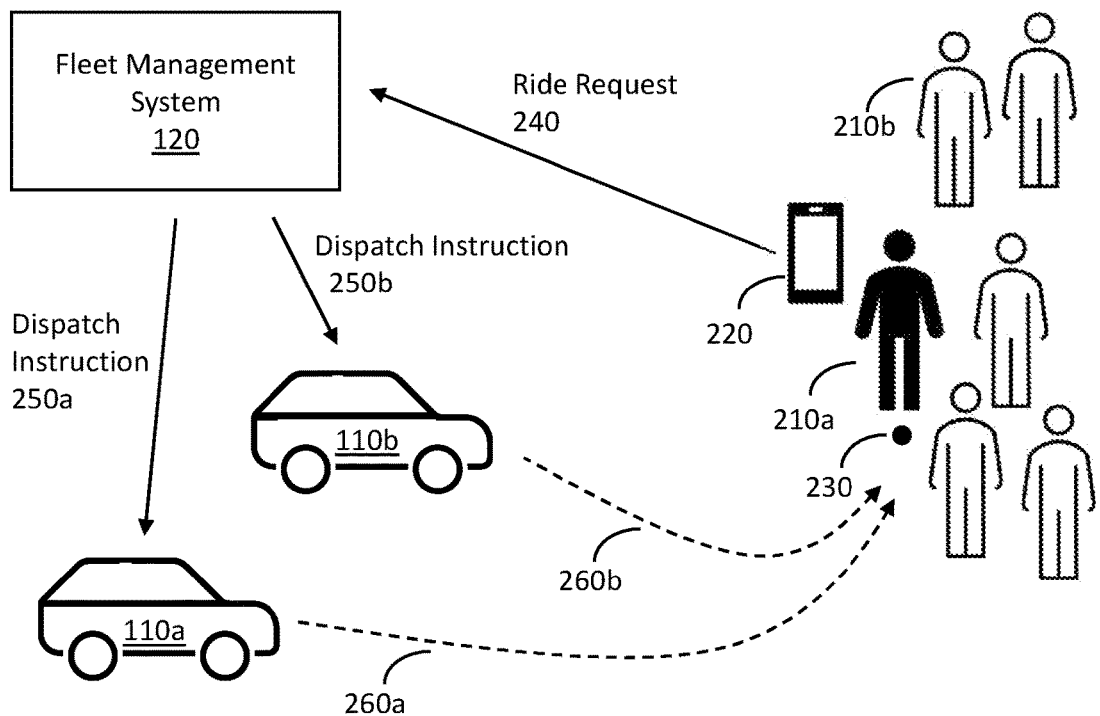
FIG. 2 is a diagram illustrating a user requesting a coordinated ride from a fleet management system according to some embodiments of the present disclosure.

FIG. 2 is a diagram illustrating a user requesting a coordinated ride from a fleet management system according to some embodiments of the present disclosure. In this example, a group of passengers 210, including passengers 210a and 210b, are seeking a ride from the fleet management system 120. In this example, one of the passengers 210a uses a user device 220 to submit a request for a ride to the fleet management system 120. The user device 220 is an example of the user device 130 described with respect to FIG. 1. The passenger 210a who submits the ride request is also referred to herein as a requesting user 210a.

The ride request 240 includes a pickup location, a destination location, and a number of passengers. In the example shown in FIG. 2, the pickup location is a current location 230 of the requesting user 210a. The current location 230 may be determined by the user device 130, e.g., using GPS sensors or other location-based sensors, or the current location 230 may be manually selected by the requesting user 210a. In other embodiments, the requesting user 210a can provide another pickup location, e.g., by entering address or a place name, by selecting a point on a map, by entering a latitude/longitude, or through other means. The requesting user 210a may also provide the destination location as an address, a place name, a point on a map, a latitude/longitude, or another reference to a place.

The ride request 240 also includes a number of passengers (e.g., 6) to be transported from the pickup location to the destination location. In some embodiments, instead of or in addition to requesting a ride for a specific number of passengers, the requesting user 210*a* requests a specific number of AVs. For example, the requesting user 210*a* may request three AVs to transport the six passengers, even though the passengers would fit in two AVs. In some embodiments, the ride request can include additional information, such as a desired pickup time or desired drop-off time, or any special needs associated with the passengers (e.g., an AV with wheelchair capacity).

The fleet management system 120 compares the number of passengers in the ride request 240 to a passenger capacity for the AVs 110. If the fleet management system 120 determines that the number of passengers is less than or equal to the passenger capacity, the fleet management system 120 can select a single AV 110 to service the ride request. Alternatively, if the fleet management system 120 determines that the number of passengers exceeds passenger capacity of an individual AV, the fleet management system 120 arranges a multi-AV coordinated ride for the group. The fleet management system 120 determines a number of AVs to service the group, e.g., by dividing the number of passengers by the passenger capacity of the AVs and rounding up any remainder. As an example, if each AV 110 can seat four passengers, and the ride request 240 is for six passengers, the fleet management system 120 determines that two AVs 110 (1.5, rounded up to 2) are sufficient to transport the number of passengers. In some embodiments, the fleet management system requests confirmation from the requesting user 210*a* to accept the coordinated ride service.

In response to determining to arrange a coordinated ride with the determined number of AVs, the fleet management system 120 selects a set of AVs to service the ride request 240. For example, the fleet management system 120 identifies AVs in the fleet of AVs 110 that are available and located proximate to the pickup location (e.g., within a certain range of distance or drive time from the pickup location). In the example shown in FIG. 2, the fleet management system 120 selects AVs 110*a* and 110*b*. The fleet management system 120 may select available AVs in the fleet that have the shortest estimated drive time to the pickup location, or available AVs that are the shortest distance from the pickup location. The fleet management system 120 may consider additional factors in selecting the AVs, such as fuel level of the AVs, geographic distribution of AVs, and other ride requests.

The fleet management system 120 transmits dispatch instructions 250*a* and 250*b* to the selected AVs 110*a* and 110*b*. The dispatch instructions 250 instruct the selected AVs 110*a* and 110*b* to drive autonomously to the pickup location (here, the current location 230). In this example, the two selected AVs 110*a* and 110*b* have different starting locations. The first selected AV 110*a* travels along a first route 260*a* to the current location 230 of the requesting user 210*a*, and the second selected AV 110*b* travels along a second route 260*b* to the current location 230 of the requesting user 210*a*.

Figure 3:
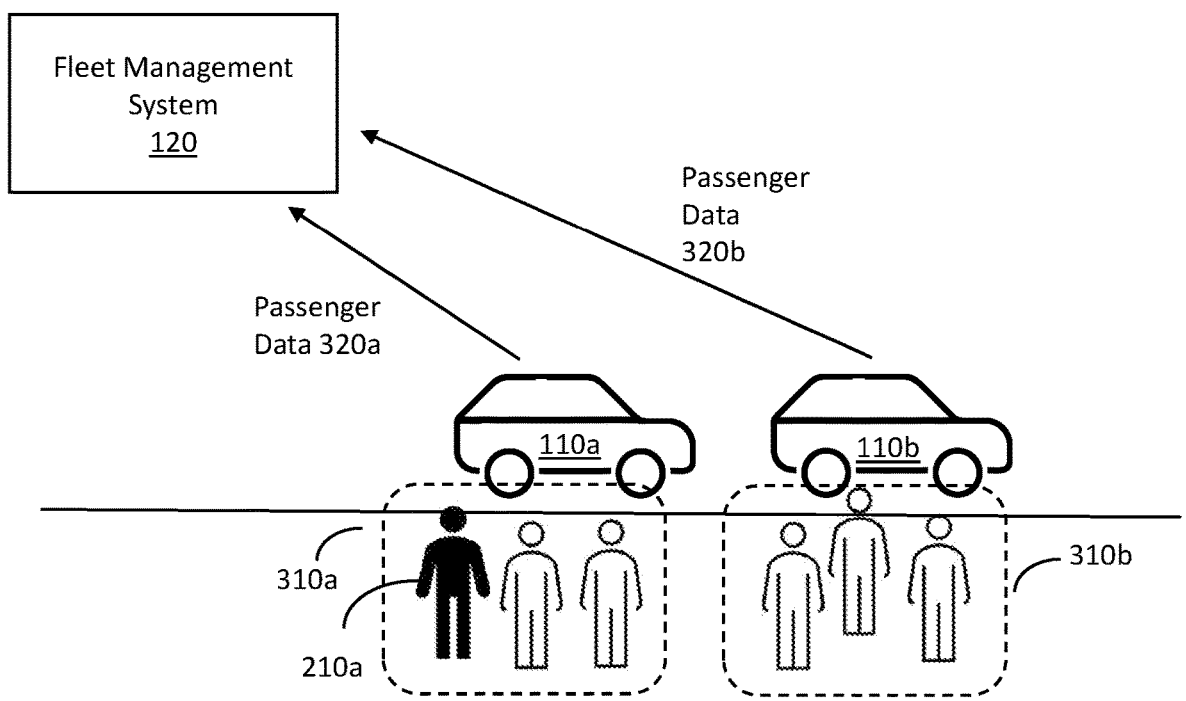
FIG. 3 is a diagram illustrating multiple AVs picking up a group of users for a coordinated ride according to some embodiments of the present disclosure.

FIG. 3 illustrates the selected AVs 110*a* and 110*b* picking up the group of passengers 210 for a coordinated ride. A first AV 110*a* is picking up a first portion of passengers 310*a* that includes the requesting user 210*a*. A second AV 110*b* is picking up a second portion of passengers 310*b*. The sensor suite 140 of each of the AVs 110*a* and 110*b* may monitor their respective portions of passengers 310*a* and 310*b* as they enter the AVs. In particular, the sensor suite 140 captures data that the onboard computer 150 can use to detect a number of passengers that enters and is seated in the AV 110. For example, exterior and/or interior cameras capture images of the environment of the AV, and the onboard computer 150 processes the images to determine a number of passengers that have entered the AV 110. As another example, weight sensors incorporated into the passenger seats transmit weight measurements to the onboard computer 150, and the onboard computer 150 determines based on the weight measurements a number of seats that have a passenger seated in them. In other embodiments, the AVs use different sensors (e.g., lidar, radar, thermal imaging, etc.) or a combination of sensors to identify passengers seated in the AV 110.

The onboard computer 150 of each of the AVs 110*a* and 110*b* transmits its respective detected number of passengers to the fleet management system 120 as passenger data 320. For example, after the first portion of passengers 310*a* enters the first AV 110*a*, the first AV 110*a* transmits passenger data 320*a* to the fleet management system 120, the passenger data 320*a* indicating that three passengers have entered the first AV 110*a*. Likewise, the second AV 110*b* transmits passenger data 320*b* indicating that three passengers have entered the second AV 110*b*. An AV 110 may transmit the passenger data 320 after the AV determines that a group of passengers has finished or is likely to have finished entering the AV 110. For example, the AV 110 may determine that the passengers have finished entering in response to detecting that the doors to the AV 110 have been closed, in response to detecting no additional people outside the AV 110 and in a given proximity of the AV 110, in response to receiving an instruction on a user interface of the AV 110 from a user to begin driving, in response to other observed user behaviors, or based on a combination of two or more detected behaviors. The fleet management system 120 determines a total number of passengers that have entered one of the selected AVs by summing the detected number of passengers from all of the AVs servicing the ride. For example, after both portions of passengers 310*a* and 310*b* have entered their respective AVs 110*a* and 110*b* and the AVs 110*a* and 110*b* transmit the passenger data 320*a* and 320*b*, the fleet management system 120 determines that six total passengers have entered the AVs.

If the detected number of passengers across the selected AVs servicing the ride does not match the expected number of passengers provided in the ride request 240, the fleet management system 120 can send an alert to the user device 220 and/or to one or more other user interfaces, such as a user interface of one or more of the AVs 110*a* and 110*b*. As one example, the second portion of passengers 310*b* enter the second AV 110*b*, and one of the passengers 310*b* indicates via a user interface in the AV 110*b* that the AV 110*b* can begin driving to the destination location. Two of the passengers 310*a* enter the first AV 110*a*, and the requesting user 210*a* indicates via an in-vehicle user interface of the AV 110*a* that the AV 110*a* can begin driving to the destination location. In this example, the requesting user 210*a* may mistakenly believe that four passengers entered the second AV 110*b*, and the first AV 110*a* can take off with only two passengers. The fleet management system 120 transmits an alert to the AV 110*a* indicating that only five passengers were detected across the two AVs 110*a* and 110*b*, and the AV 110*a* can display the alert on the in-vehicle user interface. Rather than the AVs 110*a* and 110*b* driving away with one missing passenger, the passengers in the vehicles can wait for the missing passenger, or they can take steps to find the missing passenger before taking off. Alternatively, the requesting user 210*a* or another user may override the alert, e.g., if one of the expected passengers is no longer joining the ride, or if the requesting user 210a initially miscounted the number of expected passengers.

Figure 4:
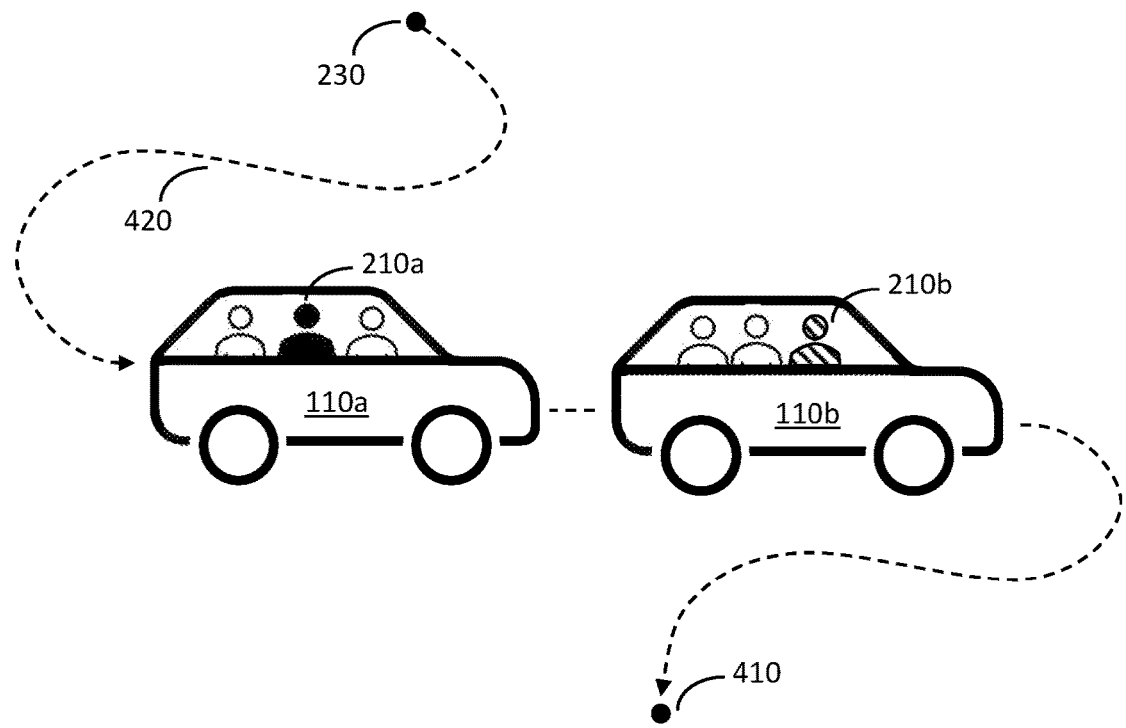
FIG. 4 is a diagram illustrating a coordinated ride service provided by multiple AVs according to some embodiments of the present disclosure.

FIG. 4 illustrates the coordinated ride service provided by the selected AVs 110a and 110b. As shown in the figure, the requesting user 210a and two other passengers are riding in AV 110a, and a second user 210b and two other passengers are riding in AV 110b. The fleet management system 120 instructs the AVs 110a and 110b to drive autonomously their respective portions of the passengers (e.g., the portions 310a and 310b) from the pickup location 230 to the destination location 410 along a route 420.

The AVs 110a and 110b may display user interfaces to the passengers during the ride. For example, each AV 110 may include one or more in-vehicle display screens that provide a user interface with information about the coordinated ride. The user interface may indicate a current location of each of the AVs providing the coordinated ride, e.g., the locations of the AVs 110a and 110b. The map may further display the route or routes of the AVs, the pickup location 230, and/or the destination location 410. In some embodiments, after one AV (e.g., AV 110b) stops at the destination location 410 and its passengers exit the AV, the map displays the precise location of the drop-off, which helps the later-arriving passengers (e.g., the passengers in AV 110a) find the earlier-arriving passengers.

In some embodiments, the fleet management system 120 provides a user interface with information about the coordinated ride to users' personal user devices. For example, the user device 220 can provide the map interface described above to the requesting user 210a. Furthermore, in some embodiments, other passengers can virtually "join" the coordinated ride with their own personal devices, e.g., by submitting a join request into an app or browser interface provided by the fleet management system 120, or by following a link associated with the ride. The join request includes a ride identifier that is associated with the coordinated ride. For example, the second user 210b receives on a user device a message from the requesting user 210a including the ride identifier, e.g., a unique link associated with the coordinated ride, or code that the second user 210b can enter into an app or browser. As another example, the second user 210b obtains a ride identifier from the second AV 110b, e.g., by scanning a QR code inside the AV 110b that identifies the AV 110b, which the fleet management system 120 associates with the coordinated ride, or by entering a code displayed on an in-vehicle display screen. In some embodiments, before allowing the second user 210b to virtually join the ride on a user device, the fleet management system 120 verifies that the second user 210b is a passenger in the coordinated ride based on a device location of the user device of the second user 210b. The user interface provided to the user device of the second user 210b may be similar to the user device provided to the user device 220 of the requesting user 210a. In some embodiments, the user interface provided to the second user 210b may have a more limited set of options than the user interface provided to the requesting user 210a, e.g., the requesting user 210a may be able to change the destination location, while the second user 210b may not.

Figure 5:
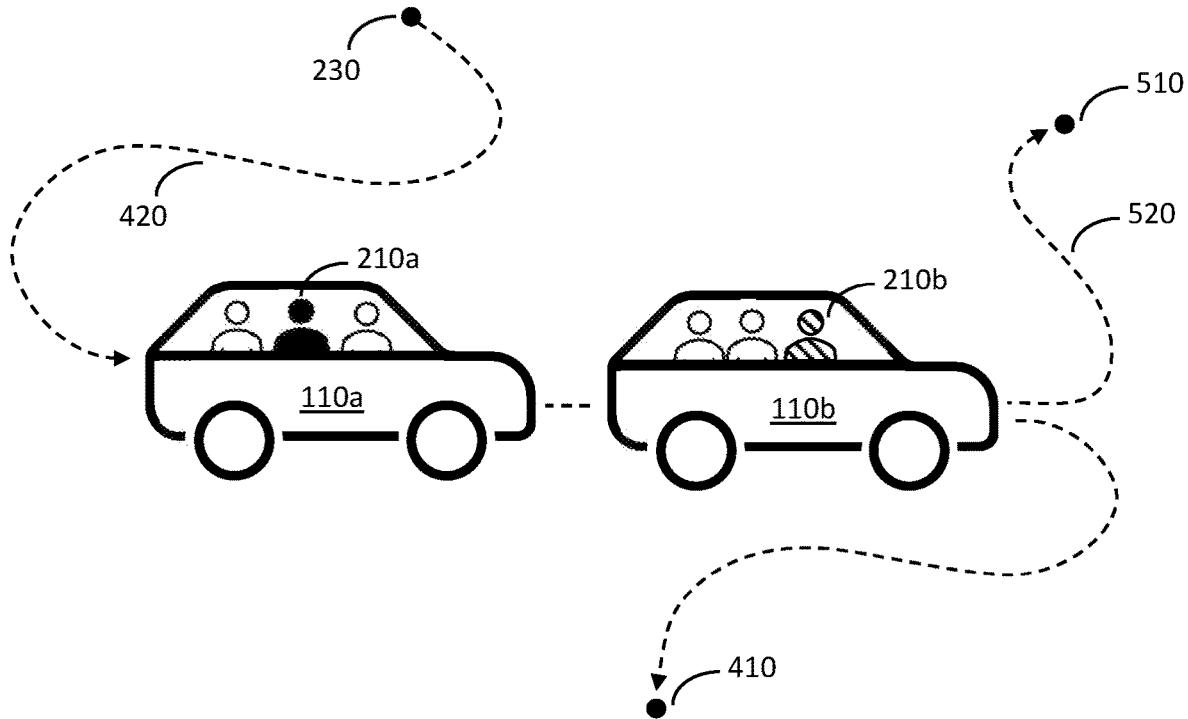
FIG. 5 is a diagram illustrating one AV diverging from a coordinated ride according to some embodiments of the present disclosure.

FIG. 5 illustrates an example in which one of the AVs diverges from the coordinated ride. In this example, the second passenger 210b submits a request through a user interface to direct the AV 110b to a second destination location 510. The second passenger 210b may submit the request on a personal device that has virtually joined the ride, as described above. Alternatively, the second passenger 210b may submit the request on an in-vehicle interface, such as a touchscreen mounted in the passenger compartment of the second AV 110b. In response to receiving the request from the second passenger 210b with the second destination location 510, the fleet management system 120 instructs the AV 110b to drive autonomously to the second destination location 510. In one example, the second destination location 510 is an additional stop (e.g., the second passenger's home, a coffee shop, an ATM, etc.), and the fleet management system 120 instructs the second AV 110b to return to the route 420 and continue on to the destination location 410 after making the stop, either with all of or a subset of the passengers currently in the second AV 110b (e.g., if the second passenger 210b leaves at the stop 510, and the other passengers continue to the destination location 410). Alternatively, the second destination location 510 may be a final destination for the passengers in the AV 110b, and the AV 110b does not continue to the destination location 410.

In some embodiments, in order to change to the route of the second AV 110b, the second passenger 210b takes control of or responsibility for the second AV 110b, and the requesting user 210a is no longer responsible for the second AV 110b. This control may include payment responsibility for the second AV 110b. In some embodiments, the fleet management system 120 requests approval from the requesting user 210a for changes submitted by the second passenger 210b. In other embodiments, e.g., if the second passenger 210b requests a short stop (e.g., at a highway rest stop) that does not significantly alter the route, the fleet management system 120 may leave responsibility for the second AV 110b with the requesting user 210a and not seek approval from the requesting user 210a for the stop. For example, the fleet management system 120 may permit adding stops that take less than five minutes of drive time, or are less than a mile or two miles from the route 420, without seeking authorization from the requesting user 210a and/or requiring another user to accept responsibility for the AV 110b.

Example Fleet Management System

Figure 6:
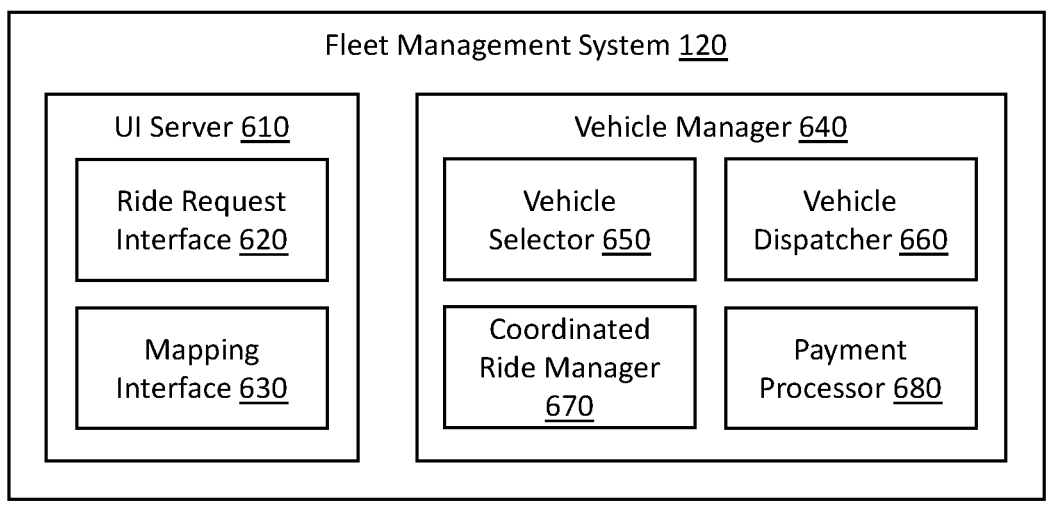
FIG. 6 is a block diagram illustrating a fleet management system according to some embodiments of the present disclosure.

FIG. 6 is a block diagram illustrating the fleet management system 120 according to some embodiments of the present disclosure. The fleet management system 120 includes a UI (user interface) server 610 and a vehicle manager 640. The UI server 610 includes a ride request interface 620 and a mapping interface 630. The vehicle manager 640 includes a vehicle selector 650, a vehicle dispatcher 660, a coordinated ride manager 670, and a payment processor 680. In alternative configurations, different and/or additional components may be included in the fleet management system 120. Further, functionality attributed to one component of the fleet management system 120 may be accomplished by a different component included in the fleet management system 120 or a different system than those illustrated.

The UI server 610 is configured to communicate with client devices that provide user interfaces to users. For example, the UI server 610 may be a web server that provides a browser-based application to client devices, or the UI server 610 may be a mobile app server that interfaces with a client app installed on client devices. The client devices include personal user devices, such as the user devices 130 and 220. The client devices may also include devices mounted in the AVs 110, such as a display screen or touch screen device mounted in the passenger compartment of an AV. In some embodiments, the fleet management system 120 includes one UI server or set of UI servers enabling user interfaces on personal devices, and another UI server or set of UI servers enabling user interfaces on in-vehicle devices.

The UI server 610 includes the ride request interface 620, which enables the users to submit requests to a ride service provided or enabled by the fleet management system 120, e.g., to request a ride from an AV 110 or from multiple AVs 110. Another user interface, the mapping interface 630, provides information to passengers about their locations and, in a coordinated ride provided by multiple AVs 110, provides information about the locations of other AVs 110 associated with the coordinated ride. The UI server 610 may include other interface features, such as interfaces for the user to view information and adjust settings relating to the AV 110, such as routing settings, temperature settings, music selections, AV behavior, etc.

More particularly, the ride request interface 620 provides an interface through which a user can submit a ride request, such as the ride request 240 described with respect to FIG. 2. The ride request may include any of the information described with respect to FIG. 2, including the number of passengers, a pickup location, and a drop-off location. In some embodiments, the ride request interface 620 includes a selectable option for a coordinated ride. If the user selects the coordinated ride option, the ride request interface 620 may provide additional options or fields to the user, e.g., a field to enter a number of passengers and/or a field to request a particular number of AVs. In some embodiments, the ride request interface 620 receives a number of passengers entered by the user in a generic ride request, compares the number of passengers in the ride request to a vehicle capacity, and determines to service the ride request using a coordinated ride based on the number of passengers. The ride request interface 620 may notify the requesting user that the fleet management system 120 can service the ride request using a coordinated ride with multiple AVs. The notification may include pricing information, timing information, and any other information useful to the requesting user in deciding whether to accept the coordinated ride. The ride request interface 620 may request confirmation from the requesting user to accept the coordinated ride.

In some embodiments, the ride request interface 620 may allow the requesting user to input multiple pickup locations, e.g., if different portions of the group of passengers are traveling to the destination from different starting locations. For each pickup location, the ride request interface 620 allows the requesting user to enter a number of passengers at the pickup location and/or a number of vehicles to pick up passengers at the pickup location. The ride request interface 620 may also allow the requesting user to select options related to a ride with multiple pickup locations. For example, the ride request interface 620 allows the requesting user to select whether one or more of the AVs picking up passengers at a first location should travel to a second location to pick up additional passengers, or if a separate AV should pick up passengers at the first and second locations. As another example, the ride request interface 620 allows the requesting user to indicate whether separate AVs traveling from the two different pickup locations should aim to arrive at the destination location at the same time, or as soon as possible. For example, if the second pickup location is closer to the destination than the first pickup location, passengers at the second pickup location may arrive at the destination earlier than passengers traveling from the first pickup location if both groups of passengers are picked up as soon as possible. The coordinated ride manager 670 may coordinate the timing of the AVs traveling from different locations, as described below.

In some embodiments, the ride request interface 620 enables a requesting user to change the destination location during the ride. In some embodiments, the ride request interface 620 enables a requesting user to add one or more stops, e.g., to stop at a shop or an ATM. The requesting user may add a stop for one AV providing the coordinated ride, or for multiple or all AVs providing the coordinated ride. In response to receiving an updated destination, extra stop, or other routing changes from the user device, the ride request interface 620 passes the updated route request information to the vehicle manager 640, which instructs one or more of the AVs providing the coordinated ride to change course.

In some embodiments, the ride request interface 620 enables a passenger other than the requesting user to change the destination or add a stop during the ride. For example, in the ride request interface 620 or another user interface, the requesting user 210*a* may select a setting that permits other passengers to make changes to the ride. Other passengers may virtually "join" the ride on their personal devices by entering a code, following a link, or through another mechanism, as described with respect to FIG. 4. In response to receiving a join request from another passenger's user device, the UI server 610 provides the ride request interface 620 to the other passenger's user device to allow them to make changes to the coordinated ride.

For example, the ride request interface 620 displays the current destination location set by the requesting user 210*a* on a second user device of a second passenger (e.g., a user device of the second user 210*b*). The ride request interface 620 enables the second passenger to submit a different destination location to change the destination location for the coordinated ride. In response, the ride request interface 620 passes the new destination location to the vehicle manager 640, which instructs all of the AVs providing the coordinated ride to change course and drive to the new destination location. In some embodiments, the ride request interface 620 provided to the requesting user 210*a* asks the requesting user 210*a* to approve destination changes submitted by other passengers. In some embodiments, the second passenger changes the destination location for one AV (e.g., the AV in which the second passenger is riding), but not the other AV or AVs providing the coordinated ride. In such embodiments, one of the AVs diverges from the route followed by the coordinated ride, as described with respect to FIG. 5.

The mapping interface 630 generates a map that shows information about the coordinated ride, including the current location of each of the AVs providing the coordinated ride. The map provided by the mapping interface 630 may be adjustable, e.g., the map allows the user to pan to show different regions, and to zoom in and zoom out. As described in relation to FIG. 4, the map may display the AV routes, pickup location, and destination location. The map may further provide precise drop-off locations where passengers exited their respective AVs so that group members can easily find each other, particularly if the AVs are not able to drop off the group members at precisely the same drop-off location (e.g., due to other traffic at the destination). If passengers access the mapping interface 630 on their personal devices, passengers who have arrived at the destination location might monitor the progress and identify the drop-off location of later-arriving passengers using the mapping interface 630.

The vehicle manager 640 manages and communicates with the fleet of AVs 110. The vehicle manager 640 assigns the AVs 110 to various tasks and directs the movements of the AVs 110 in the fleet. The vehicle manager 640 includes a vehicle selector 650, a vehicle dispatcher 660, a coordinated ride manager 670, and a payment processor 680. The vehicle selector 650 selects AVs from the fleet to perform various tasks. The vehicle dispatcher 660 instructs the AVs to perform the tasks selected by the vehicle selector 650. The coordinated ride manager 670 performs coordination tasks for the coordinated ride service. The payment processor 680 manages payment for coordinated rides. In some embodiments, the vehicle manager 640 includes additional functionalities. For example, the vehicle manager 640 instructs AVs 110 to drive to other locations while not servicing a user, e.g., to improve geographic distribution of the fleet, to anticipate demand at particular locations, etc. The vehicle manager 640 may also instruct AVs 110 to return to an AV facility for fueling, inspection, maintenance, or storage.

The vehicle selector 650 receives a ride request (e.g., ride request 240) from the ride request interface 620. The vehicle selector 650 selects one or more AVs 110 to service the ride request based on the information provided in the ride request, e.g., the number of passengers or number of AVs, and the pickup location. The vehicle selector 650 or another system may maintain or access data describing each of the AVs in the fleet of AVs 110, including current location, service status (e.g., whether the AV is available or performing a service; when the AV is expected to become available; whether the AV is schedule for future service), fuel or battery level, etc. The vehicle selector 650 may select AVs for service in a manner that optimizes one or more factors, including fleet distribution, fleet utilization, and energy consumption. The vehicle selector 650 may interface with one or more predictive algorithms that project future service requests and/or vehicle use, and select vehicles for services based on the projections.

If the ride request interface 620 receives a coordinated ride request that includes multiple pickup locations, the vehicle selector 650 selects one or more AVs for each pickup location based on the passengers located at each pickup location, e.g., one AV or set of AVs for a first pickup location, and a second AV or set of AVs for a second pickup location, based on the factors described above.

In some embodiments, the AV fleet 110 includes AVs with different passenger capacities, e.g., one type of AV that can seat four passengers, and another type of AV that can seat eight passengers. The vehicle selector 650 may determine whether to arrange a coordinated ride, and how many AVs to select for the ride, based on the numbers and types of AVs available in proximity to the pickup location. The vehicle selector 650 identifies available AVs proximate to the pickup location (e.g., within a 5 minute drive or 10 minute drive of the pickup location), identifies the available AV with the highest capacity, and sets this to be the passenger capacity when determining whether to provide a coordinated ride. In the example of FIG. 2, the vehicle selector 650 may determine that only four-seat AVs are available within a 10 minute drive of the group of passengers 210, and in response, the ride request interface 620 can notify the requesting user 210*a* that the fleet management system 120 can provide a coordinated ride for the six passengers. In another example, the vehicle selector 650 may determine that two four-seat AVs can arrive at the current location 230 of the group of passengers 210 within three minutes, but a single eight-seat AV can arrive at the current location 230 in twelve minutes. In this example, the ride request interface 620 can provide the option to the requesting user 210*a* to accept the coordinated ride or to wait for the eight-seat AV.

The vehicle dispatcher 660 transmits instructions dispatching the AVs selected by the vehicle selector 650. In particular, the vehicle dispatcher 660 instructs the selected AVs to drive autonomously to the pickup location in the ride request and to pick up a portion of the passengers associated with the ride request. After the passengers are in their respective AVs, the vehicle dispatcher 660 instructs each of the AVs to drive autonomously to the destination location. If the ride request includes multiple pickup locations or multiple destination locations, the vehicle dispatcher instructs the AVs assigned to each pickup location and destination location accordingly. The vehicle dispatcher 660 may coordinate with the coordinated ride manager 670 to ensure that the expected number of passengers have been picked up before instructing the AVs to drive to the destination location, as described below.

The coordinated ride manager 670 ensures coordination of the group of passengers and the AVs providing the coordinated ride throughout the coordinated ride. For example, the coordinated ride manager 670 receives the passenger data 320 described with respect to FIG. 3 that provides the number of passengers seated in each AV. The coordinated ride manager 670 determines a total number of passengers that have entered the AVs providing a coordinated ride by summing the detected number of passengers from all of the AVs servicing the ride, and can generate an alert if the number of detected passengers does not equal the expected number of passengers. The coordinated ride manager 670 provides the alert to the UI server 610, which can alert the passengers, as described with respect to FIG. 3. If the expected number of passengers has entered the AVs, the coordinated ride manager 670 instructs the vehicle dispatcher 660 to dispatch the AVs to the destination location.

In some embodiments, the coordinated ride manager 670 provides timing guidance to the vehicle dispatcher 660 so that the selected AVs arrive at the pickup location at the same time or approximately the same time (e.g., within 30 seconds or 1 minute of each other). The time range in which the selected AVs may arrive may depend on the number of selected AVs, with a greater number of AVs arriving at the pickup location over a longer period of time. In such embodiments, the vehicle selector 650 may select AVs that are approximately the same distance or travel time away from the pickup location, e.g., selecting two AVs that are each five minutes away from the pickup location, rather than selecting one AV that is two minutes away and a second AV that is five minutes away. Alternatively, the coordinated ride manager 670 may instruct the vehicle dispatcher 660 to hold one or more of the selected AVs at their starting location (i.e., the location from which they are dispatched) before they begin driving, so that one selected AV does not arrive at the pickup location significantly earlier than another AV. In other embodiments, the vehicle dispatcher 660 dispatches the selected AVs to the pickup location immediately, even if one or more AVs arrive significantly earlier than one or more other AVs. In some embodiments, the ride request interface 620 allows the requesting user to choose to have AVs pick up the passengers as soon as possible, even if they arrive in a staggered fashion, or to have the AVs pick up the passengers arrive in a more coordinated fashion.

In some embodiments, the coordinated ride manager 670 may provide timing guidance to the vehicle dispatcher 660 so that the selected AVs arrive at the destination location at the same time or approximately the same time (e.g., within 30 seconds or 1 minute of each other). As with the coordinated pickup time, the time range in which the selected AVs may arrive at the destination location may depend on the number of selected AVs. The coordinated ride manager 670 may monitor the AVs during the ride, and selectively slow down or speed up certain AVs so that the AVs remain synchronized. The coordinated ride manager 670 may instruct the vehicle dispatcher 660 to dispatch AVs transporting passengers from different pickup locations at particular times that the coordinated ride manager 670 predicts to cause the AVs to arrive at the destination location at approximately the same time.

In some embodiments, the coordinated ride manager 670 selects a drop-off location at or near the destination location. For example, if the destination location is a sports arena, the coordinated ride manager 670 selects a particular gate or a parking area near the sports arena for the AVs to drop off the group of passengers. The coordinated ride manager 670 may select a drop-off location that is suitable for receiving the number of passengers in the group. For example, if a group of 40 people are meeting to go to a restaurant located on a narrow street, the coordinated ride manager 670 may select a drop-off location on a larger street around the corner from the restaurant where the group may more easily assemble. The coordinated ride manager 670 provides the drop-off location (e.g., as an address or set of latitude/longitude coordinates) to the vehicle dispatcher 660, which instructs the AVs accordingly.

The payment processor 680 manages payment for the coordinated ride. The requesting user may, by default, be responsible for full payment of the coordinated ride, including both the AV in which the requesting user rides and additional AVs providing the coordinated ride. The requesting user may request that the payment processor 680 apportion the charge for the ride among some or all of the passengers. For example, the payment processor 680 may request that each passenger pay for an equal share of the coordinated ride. This allows for a more equitable split for a large group than when multiple passengers separately request rides, where each carload of passengers has a different charge (e.g., from different ride sharing services) and each carload may have a different numbers of passengers. For example, if a group of 7 passengers split into two cars from two different ridesharing services, and the charge for a car with 3 passengers is $21, and the charge for a car with 4 passengers is $20, each passenger in the first car pays $7, whereas each passenger in the second car pays $5. If, by contrast, the group requests a coordinated ride that costs $40, the payment processor 680 can charge each passenger $5.71, which the passengers may prefer.

To request the ride be apportioned among the passengers, the requesting user may provide phone numbers or email addresses of the other passengers, and the payment processor 680 may transmit payment requests to these phone numbers or email addresses. The UI server 610, or a separate payments provider, may provide a payment interface through which the passengers can provide payment information (e.g., a credit card number). In some embodiments, the payment processor 680 requests payment from users who have virtually joined the ride, as described above. The requesting user may see which passengers have virtually joined the ride and provide email addresses or phone numbers for those who have not virtually joined. If a passenger that the requesting user is requesting payment from has an existing account with the fleet management system 120, the payment processor 680 may transmit the payment request to the passenger's account, e.g., to the account associated with the phone number provided by the requesting user. From the passenger's account, the passenger may be able to confirm the charge and pay with on-file payment information, e.g., a stored credit card number. In some embodiments, if one or more of the passengers identified by the requesting user fails to pay after a set amount of time, the payment processor 680 charges the requesting user, and may notify the requesting user.

Example Method for Coordinated Dispatching of AVs

Figure 7:
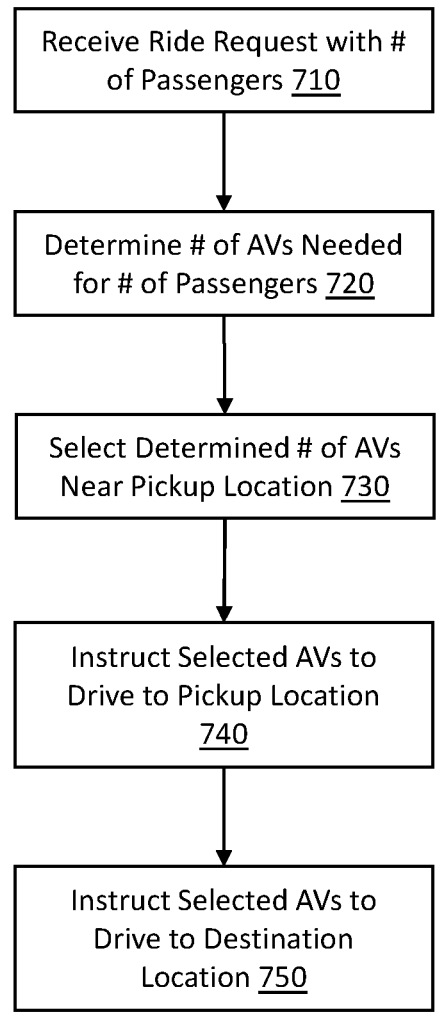
FIG. 7 is a flowchart of an example method for dispatching multiple AVs in a coordinated manner according to some embodiments of the present disclosure.

FIG. 7 is a flowchart of an example method for dispatching multiple AVs in a coordinated manner according to some embodiments of the present disclosure. A fleet management system, e.g., the UI server 610 of the fleet management system 120, receives 710 a ride request. The ride request includes the number of passengers to be driven from a pickup location to a destination location.

The fleet management system determines 720 a number of AVs needed to carry the number of passengers in the ride request, e.g., by dividing the number of passengers by a passenger capacity of the AVs available to drive the passengers. The fleet management system selects 730 the determined number of AVs that are located near the requested pickup location. For example, the vehicle selector 650 selects a set of available AVs that are closest to the pickup location from a fleet of AVs managed by the fleet management system 120.

The fleet management system instructs 740 the selected AVs to drive to the pickup location. The selected AVs pick up the group of passengers at the pickup location. The fleet management system 120 may determine that the expected number of passengers, i.e., the number of passengers in the ride request, enter the selected AVs at the pickup location. The fleet management system further instructs 750 the selected AVs to drive to the destination location with the passengers.

Select Examples

Example 1 provides a method for providing a coordinated ride, the method including receiving, from a user device, a ride request including a pickup location, a destination location, and a number of passengers, the number of passengers exceeding passenger capacity for an AV of an AV fleet, the AV fleet including a plurality of AVs; determining a number of AVs to service the ride request, the number of AVs sufficient to transport the number of passengers; selecting a set of AVs from the AV fleet to service the ride request, the set of AVs including the determined number of AVs, the set of AVs selected based on a proximity of each AV in the set of AVs to the pickup location; instructing each AV of the set of AVs to drive autonomously to the pickup location and pick up a portion of the passengers associated with the ride request; and instructing each AV of the set of AVs to drive autonomously its respective portion of the passengers to the destination location.

Example 2 provides the method of according to example 1, where the method further includes identifying available AVs in the AV fleet proximate to the pickup location, each of the available AVs having an associated number of passenger seats; determining a highest capacity AV of the available AVs, where the passenger capacity is the number of passenger seats of the highest capacity AV; and determining that the number of passengers in the ride request exceeds the passenger capacity of the highest capacity AV.

Example 3 provides the method according to example 1 or 2, where the number of passengers in the ride request is a number of passengers to be picked up at the pickup location, and the ride request further includes an additional pickup location different from the pickup location, and an additional number of passengers specifying a number of passengers to be picked up at the additional pickup location.

Example 4 provides the method according to example 3, where method further includes selecting an additional AV proximate to the additional pickup location to provide a ride service to the additional number of passengers at the additional pickup location, instructing the additional AV to drive autonomously to the additional pickup location and pick up the additional number of passengers, and instructing the additional AV to drive autonomously the additional number of passengers to the destination location.

Example 5 provides the method according to any of the preceding examples, the method further including receiving, from each AV of the set of AVs, a detected number of passengers seated in each of the AVs, the detected number of passengers determined using at least one sensor of an AV sensor suite; determining a detected number of passengers across the set of AVs based on the detected number of passengers received from each of the selected AVs; and, in response to determining that the detected number of passengers across the set of AVs is less than the number of passengers in the ride request, generating an alert.

Example 6 provides the method according to any of the preceding examples, where the user device is associated with a first passenger, and the method further includes generating a ride identifier associated with the ride request, where the ride identifier enables a second passenger to receive data describing the ride via a second user device.

Example 7 provides the method according to example 6, the destination location is a first destination location, and the method further includes providing a user interface to the second user device, the user interface providing the first destination location and enabling the second passenger to submit a second destination location different from the first destination location; receiving, from the second user device, the second destination location submitted by the second passenger; and, in response to receiving the second destination location, instructing at least one AV of the set AVs to drive autonomously its respective portion of the passengers to the second destination location.

Example 8 provides the method according to example 7, where the first passenger is in a first AV, the second passenger is in a second AV, the second destination location is part of a request from the second passenger to diverge a route of the second AV from a route of the first AV, and the method further includes assigning the second passenger control of the second AV in response to receiving the request to diverge the route of the second AV.

Example 9 provides the method according to any of the preceding examples, the method further including providing a user interface to at least one of the passengers, the user interface including a map indicating a current location of each AV of the set of AVs.

Example 10 provides the method according to example 9, the method further including receiving, from a first AV of the set of AVs, a drop-off location indicating a precise location at which a first portion of passengers exited the first AV, and indicating the drop-off location on the map of the user interface.

Example 11 provides the method according to any of the preceding examples, the method further including selecting a drop-off location proximate to the destination location, the drop-off location suitable for receiving the number of passengers; and instructing each AV of the set of AVs to drive to the drop-off location to drop off its respective passengers.

Example 12 provides a fleet management system including a user interface (UI) server and a vehicle manager. The UI server is configured to receive a ride request that includes a number of passengers, a pickup location, and a destination location. The vehicle manager is configured to determine a number of autonomous vehicles (AVs) to service the ride request, the number of AVs sufficient to transport the number of passengers; select a set of AVs from an AV fleet to service the ride request, the AV fleet including a plurality of AVs, the set of AVs including the determined number of AVs, and the set of AVs selected based on a proximity of each AV in the set of AVs to the pickup location; instruct each AV of the set of AVs to drive autonomously to the pickup location and pick up a portion of the passengers associated with the ride request; and instruct each AV of the set of AVs to drive autonomously its respective portion of the passengers to the destination location.

Example 13 provides the system according to example 12, where the UI server is further configured to receive a second ride request including a requested number of AVs, and the vehicle manager is further configured to select a second set of AVs to service the second ride request, the second set of AVs comprising the requested number of AVs.

Example 14 provides the system according to example 12 or 13, where the vehicle manager is further configured to receive, from each AV of the set of AVs, a detected number of passengers seated in each of the AVs, the detected number of passengers determined using at least one sensor of an AV sensor suite; determine a detected number of passengers across the set of AVs based on the detected number of passengers received from each of the selected AVs; and in response to determining that the detected number of passengers across the set of AVs is less than the number of passengers in the ride request, generate an alert.

Example 15 provides the system according to any of examples 12 through 14, where the UI server is further configured to provide a user interface including a map indicating a current location of each AV of the set of AVs.

Example 16 provides the system according to example 15, where the vehicle manager is further configured to receive, from a first AV of the set of AVs, a drop-off location indicating a precise location at which a first portion of passengers exited the first AV, and the UI server is further configured to indicate the drop-off location on the map.

Example 17 provides the system according to any of examples 12 through 16, where the UI server receives the ride request from a first user device associated with a first user, and the UI server is further configured to receive a join request to virtually join a ride from a second user device associated with a second user device, the join request comprising a ride identifier associated with the ride; and provide a user interface to the second user device, the user interface providing data describing the ride.

Example 18 provides a system for providing coordinated rides, the system including a plurality of AVs and a fleet management system. The fleet management system is configured to receive a request for a coordinated ride, the request comprising a number of passengers, a pickup location, and a destination location; determine a number of AVs to service the request, the number of AVs sufficient to transport the number of passengers; select a set of AVs from the plurality of AVs to service the request, the set of AVs comprising the determined number of AVs, and the set of AVs selected from the plurality of AVs based on a proximity of each AV in the set of AVs to the pickup location; instruct each AV of the set of AVs to drive autonomously to the pickup location; and instruct each AV of the set of AVs to drive autonomously to the destination location.

Example 19 provides the system according to example 18, where each AV of the set of AVs includes a sensor system configured to detected a number of seated passengers within the AV, and a communication system configured to transmit the detected number of seated passengers to the fleet management system.

Example 20 provides the system according to example 19, where the fleet management system is configured to receive, from each AV of the set of AVs, a detected number of seated passengers; determine a detected number of passengers across the set of AVs based on the detected number of seated passengers received from each of the selected AVs; and in response to determining that the detected number of passengers across the set of AVs is less than the number of passengers in the request, generate an alert.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method for providing a coordinated ride, the method comprising:
   receiving, from a user device, a ride request comprising a pickup location, a destination location, and a number of passengers, the number of passengers exceeding passenger capacity for an autonomous vehicle (AV) of an AV fleet, the AV fleet comprising a plurality of AVs;
   determining a number of AVs to service the ride request, the number of AVs sufficient to transport the number of passengers;
   selecting a set of AVs from the AV fleet to service the ride request, the set of AVs comprising the determined number of AVs, the set of AVs selected based on a proximity of each AV in the set of AVs to the pickup location;
   instructing each AV of the set of AVs to drive autonomously to the pickup location and pick up a portion of the passengers associated with the ride request;
   receiving, from each AV of the set of AVs, a detected number of passengers seated in each of the AVs, the detected number of passengers determined using at least one sensor of an AV sensor suite;
   determining a detected number of passengers across the set of AVs based on the detected number of passengers received from each of the selected AVs;
   in response to determining that the detected number of passengers across the set of AVs is less than the number of passengers in the ride request, generating an alert; and
   instructing each AV of the set of AVs to drive autonomously its respective portion of the passengers to the destination location.

2. The method of claim 1, further comprising:
  identifying available AVs in the AV fleet proximate to the pickup location, each of the available AVs having an associated number of passenger seats;
  determining a highest capacity AV of the available AVs, wherein the passenger capacity is the number of passenger seats of the highest capacity AV; and
  determining that the number of passengers in the ride request exceeds the passenger capacity of the highest capacity AV.

3. The method of claim 1, wherein the number of passengers in the ride request is a number of passengers to be picked up at the pickup location, and the ride request further comprises:
  an additional pickup location different from the pickup location, and an additional number of passengers specifying a number of passengers to be picked up at the additional pickup location.

4. The method of claim 3, further comprising:
  selecting an additional AV proximate to the additional pickup location to provide a ride service to the additional number of passengers at the additional pickup location;
  instructing the additional AV to drive autonomously to the additional pickup location and pick up the additional number of passengers; and
  instructing the additional AV to drive autonomously the additional number of passengers to the destination location.

5. The method of claim 1, wherein the user device is associated with a first passenger, the method further comprising:
  generating a unique ride identifier associated with the ride request, wherein the unique ride identifier enables a second passenger in a second AV of the set of AVs to receive data describing the ride via a second user device.

6. The method of claim 5, wherein the destination location is a first destination location, the method further comprising:
  providing a user interface to the second user device, the user interface providing the first destination location and enabling the second passenger to submit a second destination location different from the first destination location;
  receiving, from the second user device, the second destination location submitted by the second passenger; and
  in response to receiving the second destination location, instructing at least one AV of the set AVs to drive autonomously its respective portion of the passengers to the second destination location.

7. The method of claim 6, wherein the first passenger is in a first AV, the second destination location is part of a request from the second passenger to diverge a route of the second AV from a route of the first AV, the method further comprising:
  in response to receiving the request to diverge the route of the second AV, assigning the second passenger control of the second AV.

8. The method of claim 1, further comprising:
  providing a user interface to at least one of the passengers, the user interface comprising a map indicating a current location of each AV of the set of AVs.

9. The method of claim 8, further comprising:
  receiving, from a first AV of the set of AVs, a drop-off location indicating a precise location at which a first portion of passengers exited the first AV; and
  indicating the drop-off location on the map of the user interface.

10. The method of claim 1, further comprising:
  selecting a drop-off location proximate to the destination location, the drop-off location suitable for receiving the set of AVs and suitable for receiving the number of passengers riding in the set of AVs; and
  instructing each AV of the set of AVs to drive to the drop-off location to drop off its respective passengers.

11. A fleet management system comprising:
  a user interface (UI) server configured to receive a ride request comprising a number of passengers, a pickup location, and a destination location; and
  vehicle manager configured to:
    determine a number of autonomous vehicles (AVs) to service the ride request, the number of AVs sufficient to transport the number of passengers;
    select a set of AVs from an AV fleet to service the ride request, the AV fleet comprising a plurality of AVs, the set of AVs comprising the determined number of AVs, and the set of AVs selected based on a proximity of each AV in the set of AVs to the pickup location;
    instruct each AV of the set of AVs to drive autonomously to the pickup location and pick up a portion of the passengers associated with the ride request;
    receive, from each AV of the set of AVs, a detected number of passengers seated in each of the AVs, the detected number of passengers determined using at least one sensor of an AV sensor suite;
    determine a detected number of passengers across the set of AVs based on the detected number of passengers received from each of the selected AVs;
    in response to determining that the detected number of passengers across the set of AVs is less than the number of passengers in the ride request, generate an alert; and
    instruct each AV of the set of AVs to drive autonomously its respective portion of the passengers to the destination location.

12. The system of claim 11, wherein the UI server is further configured to receive a second ride request comprising a requested number of AVs, and the vehicle manager is further configured to select a second set of AVs to service the second ride request, the second set of AVs comprising the requested number of AVs.

13. The system of claim 11, wherein the UI server is further configured to provide a user interface comprising a map indicating a current location of each AV of the set of AVs.

14. The system of claim 13, wherein the vehicle manager is further configured to receive, from a first AV of the set of AVs, a drop-off location indicating a precise location at which a first portion of passengers exited the first AV, and the UI server is further configured to indicate the drop-off location on the map.

15. The system of claim 11, wherein the UI server receives the ride request from a first user device associated with a first user, and the UI server is further configured to:
  receive a join request to virtually join a ride from a second user device associated with a second user device, the join request comprising a ride identifier associated with the ride; and
  provide a user interface to the second user device, the user interface providing data describing the ride.

16. A system for providing coordinated rides comprising:
a plurality of autonomous vehicles (AVs); and
a fleet management system configured to:
- receive a request for a coordinated ride, the request comprising a number of passengers, a pickup location, and a destination location;
- determine a number of AVs to service the request, the number of AVs sufficient to transport the number of passengers;
- select a set of AVs from the plurality of AVs to service the request, the set of AVs comprising the determined number of AVs, and the set of AVs selected from the plurality of AVs based on a proximity of each AV in the set of AVs to the pickup location;
- instruct each AV of the set of AVs to drive autonomously to the pickup location;
- receive, from each AV of the set of AVs, a detected number of seated passengers;
- determine a detected number of passengers across the set of AVs based on the detected number of seated passengers received from each of the selected AVs; and
- in response to determining that the detected number of passengers across the set of AVs is less than the number of passengers in the request, generate an alert; and
- instruct each AV of the set of AVs to drive autonomously to the destination location.

17. The system of claim 16, wherein each AV of the set of AVs comprises:
- a sensor system configured to detect a number of seated passengers within the AV; and
- a communication system configured to transmit the detected number of seated passengers to the fleet management system.

18. The fleet management system of claim 11, the vehicle manager further configured to:
- select a drop-off location proximate to the destination location, the drop-off location suitable for receiving the set of AVs and suitable for receiving the number of passengers riding in the set of AVs; and
- instruct each AV of the set of AVs to drive to the drop-off location to drop off its respective passengers.

19. The method of claim 1, wherein the at least one sensor of an AV sensor suite comprises an interior sensor, the interior sensor comprising a seat weight sensor, a camera, a radar sensor, or a thermal imaging sensor.

20. System of claim 16, wherein the each of the plurality of AVs comprises an AV sensor suite having interior sensors, the interior sensors comprising a seat weight sensor, a camera, a radar sensor, or a thermal imaging sensor.

\* \* \* \* \*